US 6,652,899 B1

(12) United States Patent
Keel

(10) Patent No.: US 6,652,899 B1
(45) Date of Patent: Nov. 25, 2003

(54) DIRECT SHREDDING PROCESS

(75) Inventor: Thomas Allen Keel, Reedsburg, WI (US)

(73) Assignee: Foremost Farms, Reedsburg, WI (US)

( * ) Notice: Subject to any disclaimer, the term of this patent is extended or adjusted under 35 U.S.C. 154(b) by 0 days.

(21) Appl. No.: 09/250,294

(22) Filed: Feb. 17, 1999

(51) Int. Cl.[7] .................... A23C 19/064; A23C 19/024
(52) U.S. Cl. ................... 426/516; 426/582; 426/518
(58) Field of Search ................ 426/580, 582, 426/516, 518; 99/353, 537; 425/306, 308, 317

(56) References Cited

U.S. PATENT DOCUMENTS

| 3,078,169 A | * | 2/1963 | McCadam | 426/36 |
| 3,707,769 A | * | 1/1973 | Syrjanen et al. | 99/460 |
| 3,843,801 A | * | 10/1974 | Efthymiou | 426/36 |
| 3,980,235 A | * | 9/1976 | Kuhlman | 241/84 |
| 4,366,174 A | * | 12/1982 | Kneubuehl et al. | 426/36 |
| 4,476,143 A | * | 10/1984 | Czulak et al. | 426/40 |
| 4,665,811 A | * | 5/1987 | Meyer | 99/455 |
| 5,234,700 A | * | 8/1993 | Barz et al. | 426/42 |
| 5,709,900 A | * | 1/1998 | Miller et al. | 426/582 |
| 5,948,459 A | * | 9/1999 | Telford | 426/582 |
| 6,152,021 A | * | 11/2000 | Weinstein et al. | 99/353 |
| 6,340,490 B1 | * | 1/2002 | Owens | 426/518 |
| 6,415,711 B1 | * | 7/2002 | Penta | 99/465 |

FOREIGN PATENT DOCUMENTS

| DE | 3639438 | * | 5/1986 |
| DE | 369438 | * | 5/1988 |

* cited by examiner

Primary Examiner—Nina Bhat
(74) Attorney, Agent, or Firm—Kenyon & Kenyon

(57) ABSTRACT

A method of producing shredded cheese according to the present invention comprises producing cheese in a mixer; forming the cheese into cubes, the cubes being sized for shredding in a shredder; salting the cubes in a brine solution; and shredding the cubes in the shredder. The cheese may be cubed in a cubing device according to the present invention, which comprises an extrusion transfer tube connected to an infeed line. The extrusion transfer tube has an output end, where the cheese exits in the form of a log. A trim knife disposed at the output end of the extrusion transfer tube squares the log, and a cross-cut knife disposed adjacent to the trim knife cuts the log into cubes.

17 Claims, 4 Drawing Sheets

DIRECT SHREDDING PROCESS

FIELD OF THE INVENTION

The present invention relates to a method and apparatus for shredding a product, and in particular for shredding cheese.

BACKGROUND INFORMATION

Many products are produced or sold in a shredded form, for example cheeses such as mozzarella or other pizza cheese. Cheeses are often initially produced as large loaves of unfinished product (typically 6 to 20 pounds per loaf). The loaves may then be soaked in a brine bath to achieve salting. After salting, the loaves may be shipped or stored for a total of approximately ten days, after which time the large loaves may be cut into cubes. The cubes are processed by a shredder into the finished, shredded product.

The conventional method of producing and shredding product in the above manner creates several problems. For example, due to the large size of the initial loaves, they must be soaked in brine for approximately 8 to 18 hours before subsequent processing. In addition, the process of first producing and salting loaves, then shipping and/or storing the loaves, and finally transferring the loaves to a cubing device increases the chance of contamination due to frequent intermittent handling.

SUMMARY OF THE INVENTION

A method of producing shredded cheese according to the present invention comprises producing cheese in a mixer; forming the cheese into cubes, the cubes being sized for shredding in a shredder; salting the cubes in a brine solution; and shredding the cubes in the shredder. The cheese may be cubed in a cubing device according to the present invention, which comprises an extrusion transfer tube connected to an infeed line. The extrusion transfer tube has an output end, where the cheese exits in the form of a log. A trim knife disposed at the output end of the extrusion transfer tube squares the log, and a cross-cut knife disposed adjacent to the trim knife cuts the log into cubes.

DETAILED DESCRIPTION

Figure 1:
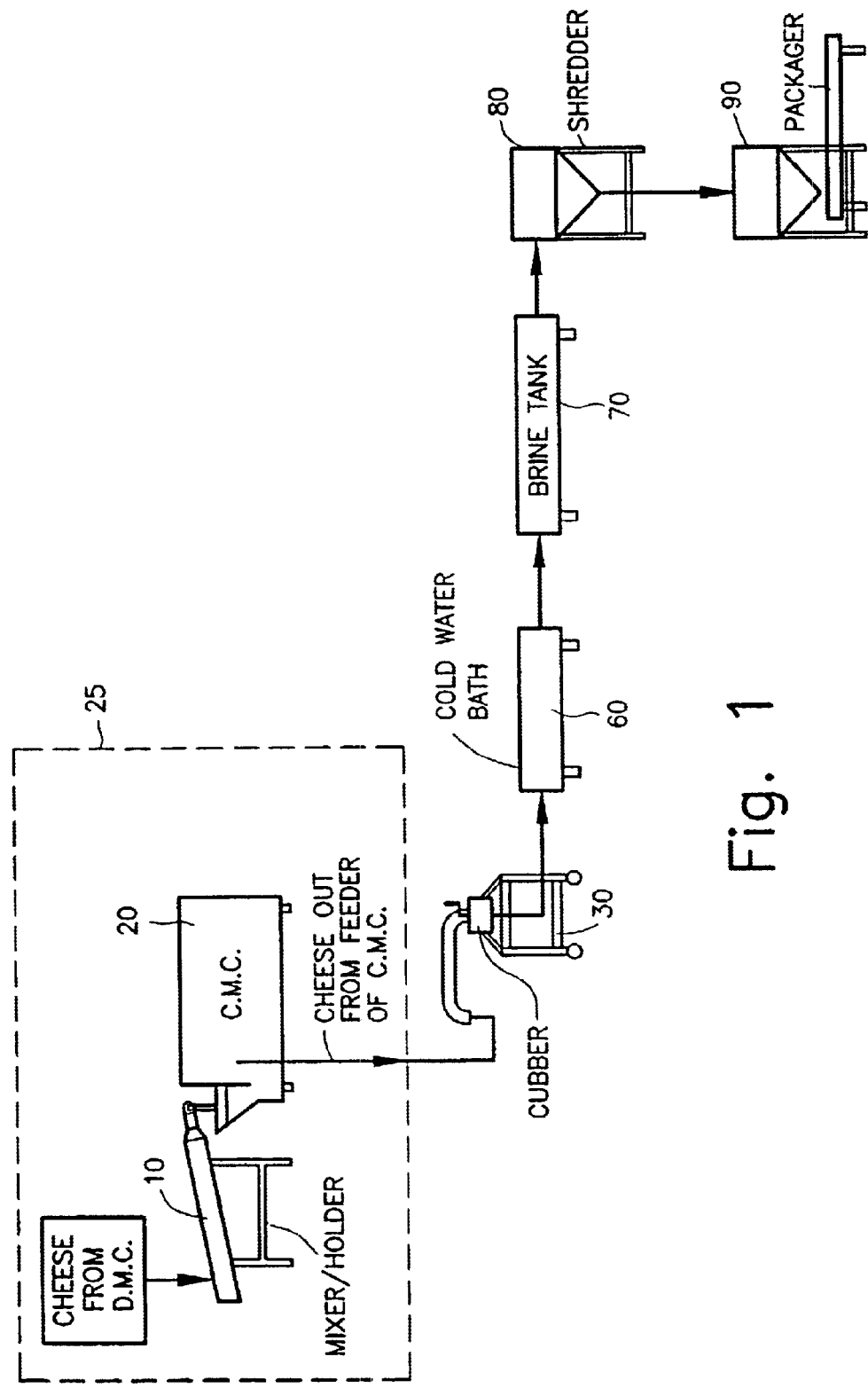
FIG. 1 is a schematic view of an exemplary direct shredding process and apparatus according to the present invention.

FIG. 1 shows a schematic view of an exemplary direct cheese shredding process according to the present invention. In general, the exemplary process includes producing cheese or another product, formning the cheese into cubes of the size processed by a conventional shredder, salting the cubes in a brine solution, and shredding the cubes in the shredder. In contrast to conventional process in which large loaves of cheese are formed and salted, a process according to the present invention requires a much shorter salting period and significantly less manual handling, minimizing the possibility of contamination. While the description here and below generally refers to cheese as the product being produced or shredded, it is understood that a process or apparatus according to the present invention may be used for any other suitable product as well, and the specific description as to cheese is for convenience only.

Referring to FIG. 1, a process according to the present invention begins with the initial production of cheese product itself. This may be achieved in any suitable manner, and in the illustrated embodiment the product is formed in a draining matting conveyor ("D.M.C") (not shown), transferred to a mixer/molder 10, and then to a continuous molder chiller 20 ("C.M.C."). For clarity, these initial steps are generally referred to as "producing cheese," and are generally referred to as being performed in a mixer 25. The terms "producing cheese" and "mixer" therefore include any initial production of cheese, using any device, which may be suitable in conjunction with the present invention, and should not be limited to the method and machinery described above.

After cheese is produced in mixer 25, it is transferred to a cuber 30. Cuber 30 forms the cheese into cubes which are of a size suitable for shredding by a conventional shredder. The cubes may be any suitable size, but preferably the cubes are approximately two inches per side. This is presently the size accepted by most conventional shredders. Cuber 30 may be any suitable device for forming the cheese into cubes, but preferably a cuber 30 according to the present invention illustrated in FIGS. 2 through 4 and described below, is utilized in conjunction with a process according to the present invention.

Figure 2:
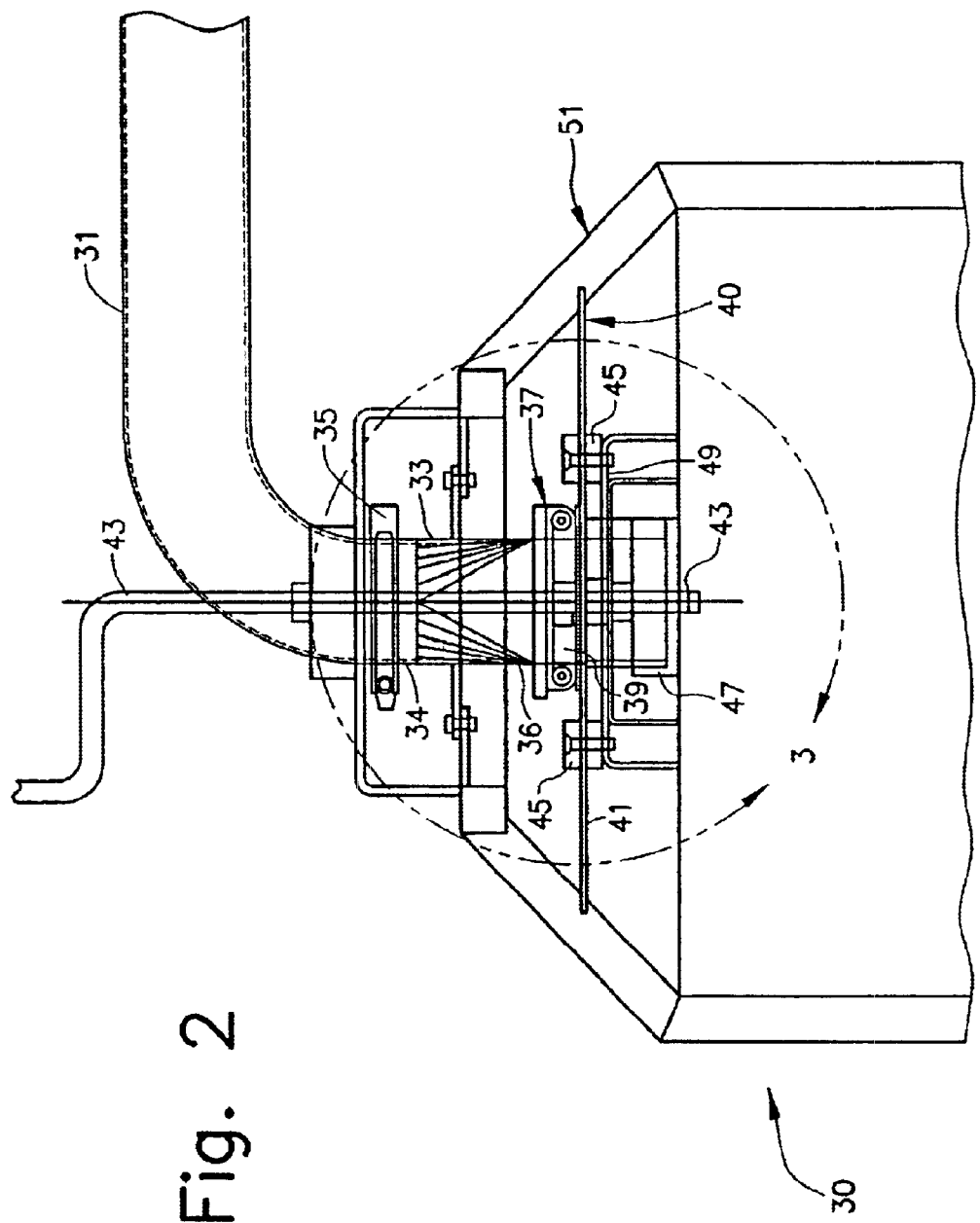
FIG. 2 is a cross-sectional side view of an exemplary cubing device according to the present invention.
Figure 3:
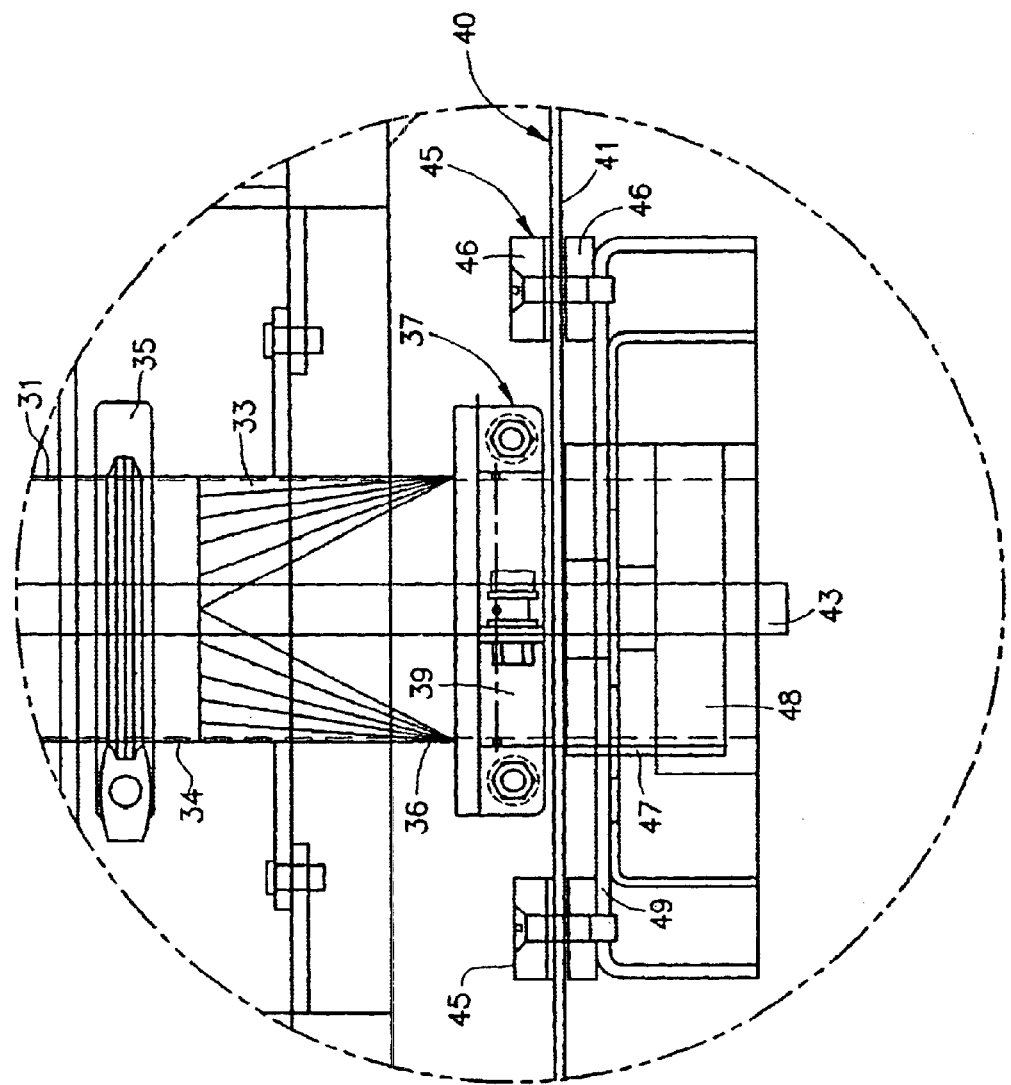
FIG. 3 is an enlarged view of a portion of the exemplary cubing device of FIG. 2, highlighted by the dashed circle "3" of FIG. 2.
Figure 4:
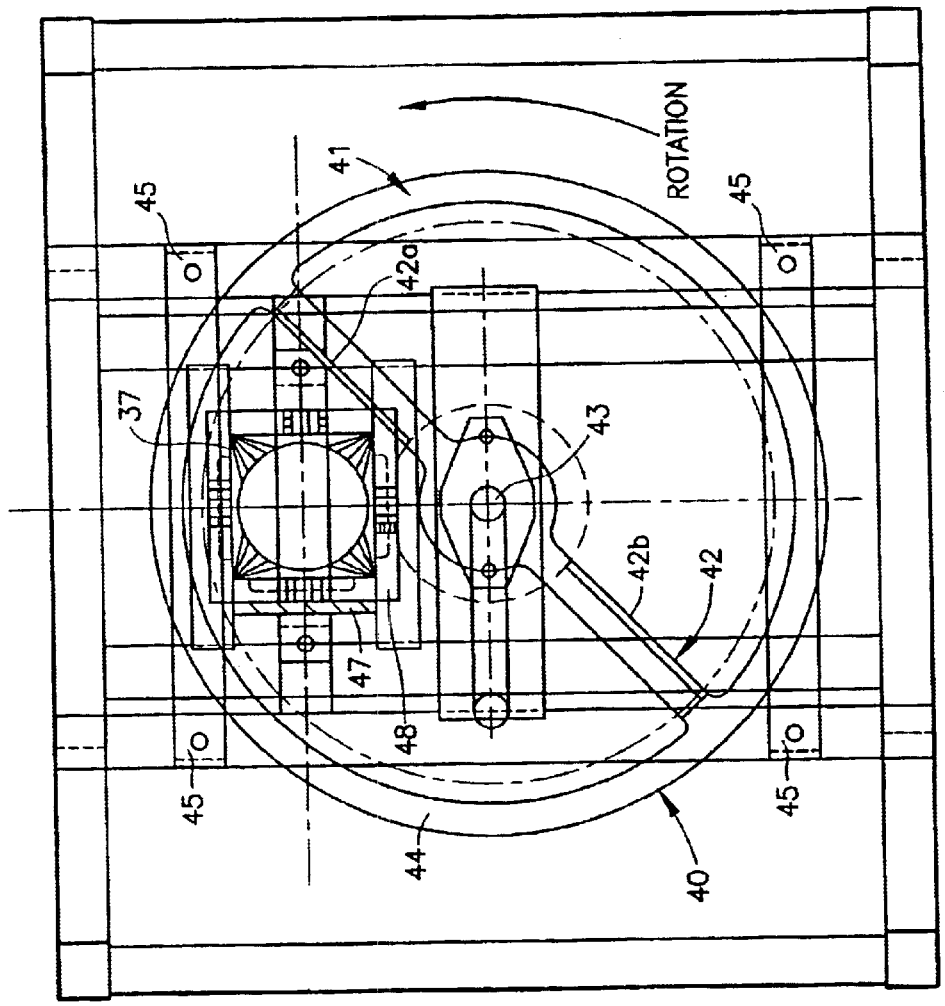
FIG. 4 is a bottom view of the exemplary cubing device of FIG. 2.

FIG. 2 illustrates an exemplary cuber 30 according to the present invention. Cheese is fed to cuber housing 30 via an infeed line 31. Infeed line 31 terminates at an extrusion transfer tube 33, which may be connected to the infeed line 31 with, for example, a hose clamp 35. Preferably infeed line 31 and extrusion transfer tube 33 are formed separately and connected, but the two may be formed integrally if desired. Extrusion transfer tube 33 may be any suitable shape, but preferably includes a first portion having a substantially circular cross section, for example an input end 34, and a second portion having a substantially square cross section, for example an output end 36. This exemplary embodiment is best illustrated in FIG. 3. In this exemplary configuration, input end 34 is connected to infeed line 31, and output end 36 feeds a log of cheese to the remainder of cuber 30. If output end 36 is formed with a substantially square cross section, then extrusion transfer tube 33 will extrude a log of cheese having a somewhat square cross section as well.

Once extruded, the log contacts a trim knife 37, which squares the log, meaning it provides the log with a square or substantially square cross section. If extrusion transfer tube 33 provides a more circular log of cheese, then trim knife 37 essentially acts as the mechanism to square the log of cheese. If extrusion transfer tube 33 extrudes a log of cheese already somewhat square or substantially square in cross section, the trim knife 37 acts to more clearly define the square cross section. Preferably trim knife 37 is formed as a wire harp knife having a plurality of blades 39 arranged substantially in the form of a square.

A cross-cut knife 40 is disposed adjacent to trim knife 37. Cross-cut knife cuts the squared log transversely into cubes. Preferably cross-cut knife is formed as a rotating knife 41, which rotates around a knife shaft 43 which is axially offset from extrusion transfer tube 31. Rotating knife 41, best illustrated in FIG. 4, includes a plurality of rotating blades 42 extending radially outwardly from knife shaft 43, and in the illustrated embodiment two rotating blades 42a and 42b are shown.

In order to stabilize rotating blades 42, rotating knife 41 preferably includes a circular stabilizing ring 44 connected to the outer end of each rotating blade 42. Stabilizing ring 44 increases the angular moment of rotating knife 41, thereby stabilizing rotating knife 41 and enhancing the its cutting ability. In addition, cuber 30 may be provided with at least one knife guide 45 including a pair of shims 46. Stabilizing ring 44 may then be maintained between shims 46, which may retain rotating knife 41 in an axial position.

While being cut transversely, the log of cheese sometimes has a tendency to shift laterally. In order to prevent this shifting, a pressure plate 47 is provided adjacent to cross-cut knife 40 to provide an abutment for the log of cheese. When the log of cheese is cut transversely, pressure plate 47 maintains the log in a lateral position, easing the transverse cut. Pressure plate 47 is retained in place by a pressure plate support structure 49, which may be any suitable configuration, as desired.

Once the cubes are formed, they are typically be rinsed in a water bath 60. Water bath 60 may be used to rinse fat off the cubes prior to salting. If present, water bath 60 is preferably between approximately 34° F. and 36° F. Cubes may be soaked for any suitable period of time in order to wash off an amount of fat, mild solids, or other by-products. Preferably these by-products are recovered and reprocessed in mixer 25 to minimize waste. The water in water bath 60 may be changed periodically, if necessary.

After cubing and (if desired) rinsing, the cubes are placed in brine solution. In the illustrated embodiment, the cubes are soaked in brine tank 70. In a conventional cheese production and cheese shredding process, the cheese is formed into large loaves, for example between six and twenty pounds, and these loaves are soaked in brine solution. The production of large loaves is typical because the loaves are stored prior to salting, allowing the cheese to age a necessary period of time (for example approximately ten days for mozzarella and similar cheeses). Also, large loaves allow for a steady and even salt uptake, albeit over a relatively long period of time.

In a process according to the present invention, the relatively small cheese cubes are soaked in a brine solution that is preferably between approximately 55 percent and approximately 65 percent salt by weight, for example sodium chloride. The salt solution is preferably maintained at a temperature between approximately 26° F. and approximately 28° F. The preferred temperatures and salinity allow for appropriate uptake of salt by the cubes despite their relatively small size, although salt solutions of other suitable temperature or salinity may be provided, if desired. Preferably the cubes are bathed in the salt solution for approximately 20 minutes, but the exact amount of time may vary given the particular parameters of the brine solution.

After salting, the cubes are shredded in any suitable shredder 80. If desired, this may be done after the cubes are stored for a period of time, but in the preferred process the cubes move from brine tank 70 to shredder 80 without any additional storage time. One of the primary benefits a process according to the present invention is that it minimizes handling of the cheese, and therefore the possibility of contamination due to handling. Accordingly, while the cubes may be handled or stored (either manually or automatically), the journey from the brine solution to shredder 80 is preferably direct a relatively direct one. Because the cheese is already formed into the cube size accepted by most conventional shredders, no additional handling is necessary.

After shredding, the cheese is ready for packaging in any suitable packager 90. Once packaged, it may be desirable to store the cheese for some period of time to ensure proper aging before use. This storage poses little risk of contamination because the cheese is already packaged. In some cases, the lines of distribution may be such that the cheese will be sufficiently aged before its delivery for end use.

The process and device according to the present invention have been described with respect to several exemplary embodiments. It can be understood, however, that there are many other variations of the above-described embodiments which will be apparent to those skilled in the art, even where elements have not explicitly been designated as exemplary. For example, cuber 30 may be disposed in a housing 51 so that cubed cheese falls to a bin or belt (not shown) where it may easily be transferred to water bath 60 or brine tank 70. Similarly, various mechanisms (not shown) may be employed to transfer cheese or cubed cheese from one process point to another. It is understood that these modifications are within the teaching of the present invention, which is to be limited only by the claims appended hereto.

What is claimed is:

1. A method of producing shredded cheese, comprising:

producing the cheese in a mixer;

extruding the cheese from the mixer to a cuber;

forming the cheese into blocks sized for shredding in a shredder;

salting the blocks in a brine solution; and shredding the blocks in the shredder.

2. The method according to claim 1, wherein the brine solution is approximately 60 percent sodium chloride by weight, wherein a temperature of the brine solution is between approximately 26° F. and approximately 28° F., and wherein the blocks are salted for approximately 20 minutes.

3. The method according to claim 1, wherein the cheese being extruded from the mixer is transferred to the cuber via a transfer tube.

4. The method according to claim 3, wherein the brine solution is approximately 60 percent sodium chloride by weight, wherein a temperature of the brine solution is between approximately 26° F. and approximately 28° F., and wherein the blocks are salted for approximately 20 minutes.

5. The method according to claim 3, wherein the cheese exits the transfer tube as a log, and wherein forming the cheese into cubes includes squaring the log and cutting the log into blocks having a size of approximately two inches by two inches by two inches.

6. The method according to claim 5, wherein the brine solution is approximately 60 percent sodium chloride by weight, wherein a temperature of the brine solution is between approximately 26° F. and approximately 28° F., and wherein the cubes are salted for approximately 20 minutes.

7. The method according to claim 1, further comprising, prior to salting the blocks, rinsing the blocks in a water bath.

8. The method according to claim 7, wherein the brine solution is approximately 60 percent sodium chloride by weight, wherein a temperature of the brine solution is between approximately 26° F. and approximately 28° F., and wherein the blocks are salted for approximately 20 minutes.

9. The method according to claim 8, wherein the water bath has a temperature between approximately 34° F. and approximately 36° F.

10. The method according to claim 1 further comprising:

extruding the cheese through a transfer tube, the cheese exiting the transfer tube being in the form of a cheese log.

11. The method of claim 10 further comprising:

squaring the cheese log exiting the transfer tube with a trim knife.

12. The method of claim 10 further comprising:

cross-cutting the cheese log exiting the transfer tube with a cross-cutting knife.

13. The method of claim 12 further comprising:

applying pressure to the cheese log to retain the cheese log in a lateral position as the cheese log is cut by the cross-cutting knife.

14. The method of claim 13 wherein the cross-cutting knife includes a wire harp knife, the wire harp knife including a plurality of harp knife blades arranged to form a square.

15. The method of claim 12 wherein a rotating knife is used to cross-cut the cheese-log.

16. The method of claim 15, wherein the rotating knife includes a circular stabilizing ring.

17. The method of claim 10, wherein an exiting orifice of the transfer tube has a square cross section.

* * * * *